Patented Dec. 18, 1928.

1,695,808

UNITED STATES PATENT OFFICE.

JOHN LANGBEIN, OF HAMBURG, GERMANY.

COMPOSITION TO BE ADDED TO CEMENT MIXINGS FOR COLD GLAZES OR THE LIKE.

No Drawing. Application filed May 20, 1925, Serial No. 31,707, and in France February 18, 1925.

Gildings on cement not sufficiently set and not yet two years old, on artificial stones, or on cement cold-glazes, which exude alkalis or salts, are not durable, because the oil base or gilding varnish is destroyed by the alkalis or salts. Furthermore, cement cold-glazes could not be made acidproof. The hitherto known cold-glazes consist of a mixture of cement and water with an addition of bitumen, sebacic acids and oils, which is painted on cement or concrete and which hardens to a superficial glaze thereon. Said glazes do not possess sufficient constancy of volume for their being gilded and show, moreover, deep cracks especially when the glaze is heated. Hitherto, no addition has become known by which constancy of volume is given to the glaze. The glazes, furthermore, do not get sufficiently hard. All these inconveniences are overcome by the present invention.

The object of my invention is the production of a composition for improving cold-glazes on cement or concrete in such a way that they are made capable of being reliably gilded.

My composition consists of a mixture of polymerized linseed oils, ammoniacal water, lime water, and infusorial earth, to which in one case barium- or strontium-oxide, and in another case chromates, can be added.

Said mixture is added to the conventional cement mixings, which are to serve as cold-glazes, in a proportion of about 1:3½ of the quantity of dry cement employed.

Polymerized linseed oil remains unaltered in the cement and preserves its drying capability without reducing the binding power of the cement.

Ammoniacal water serves for a better distribution of said oil in the mixture, the oil being, by its polymerization, prevented from saponifying with the alkalis.

The lime water forms the binding liquid of the mixture.

Infusorial earth imparts to the glaze produced a high constancy of volume and makes the same plastic, whereby it can be applied with a brush or spattle.

Barium- or strontium-oxide increases the gloss of the glaze produced.

Chromates make the glaze very hard.

In preparing the mixture, I prefer to use the ingredients in about the following proportions, viz.: 250 parts by weight of polymerized linseed-oil, 660 parts by weight of ammoniacal water, 5750 parts by weight of lime water, 1000 parts by weight of infusorial earth, and, if required, 400 parts by weight of barium- or strontium-oxide, as well as 940 parts by weight of chromates; together 9000 parts by weight.

Instead of linseed-oil, double the quantity of wood-oil can be used, while the infusorial earth can be replaced by double the quantity of molar earth, this being a natural earth found in Denmark and consisting of infusorial earth, clay, and ferrous oxide. The infusorial earth, or molar earth, may be admixed with asbestos.

To gild the cold-glazes produced with the improved mixture, the same are first coated with artificial resin solutions of brown kind, whereupon the gilding is applied in the conventional manner.

What I claim, is:

A composition of matter comprising a mixture of polymerized linseed oil, ammoniacal water, milk of lime, and infusorial earth in the proportions of 250:660:5750:1000 parts by weight respectively, for the purpose set forth.

In testimony whereof I have hereunto set my hand.

JOHN LANGBEIN.